United States Patent [19]
Kajiki et al.

[11] Patent Number: 6,084,913
[45] Date of Patent: *Jul. 4, 2000

[54] METHOD FOR COMPRESSING DYNAMIC IMAGE INFORMATION AND SYSTEM AND DEVICE THEREFOR

[75] Inventors: Noriko Kajiki; Satoshi Tanabe, both of Tokyo, Japan

[73] Assignee: Kabushiki Kaisha Office Noa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/962,167

[22] Filed: Oct. 31, 1997

[30] Foreign Application Priority Data

May 29, 1997 [JP] Japan ..................................... 9-247450

[51] Int. Cl.$^7$ ....................................................... H04N 7/12
[52] U.S. Cl. ........................... 375/240; 348/403; 348/420
[58] Field of Search .................................. 348/403, 384, 348/390, 404, 420, 421, 206, 405; 382/232, 248, 250, 251, 235; 386/111; H04N 7/12

[56] References Cited

U.S. PATENT DOCUMENTS

| | | | |
|---|---|---|---|
| 5,164,819 | 11/1992 | Music | 348/420 |
| 5,473,704 | 12/1995 | Abe | 382/235 |
| 5,548,336 | 8/1996 | Ueda | 348/384 |
| 5,751,888 | 5/1998 | Fukuchi et al. | 386/111 |

OTHER PUBLICATIONS

Huffman, David A., "A Method for the Construction of Minimum–Redundancy Codes", Proceedings of the I.R.E, pp. 1098–1101, Sep. 1952.

*Primary Examiner*—Young Lee
*Attorney, Agent, or Firm*—Rader, Fishman & Grauer

[57] ABSTRACT

A method and system for compressing dynamic image information includes a divider which divides each frame of dynamic image data of 16 frames into 4×4 pixel blocks that are non-overlapping. A first zigzag scanner arranges each of the blocks in the order of the frames to form a 16×16 block. A two-dimensional orthogonal transformer subjects the 16×16 block to a two-dimensional DCT to encode the units of the block in a frequency band. A quantizer multiplies the 16×16 data by quantization coefficients to approximate the value of the data at discrete levels. A second scanner stores the quantized DCT data as a one-dimensional array from low to high frequency components. A variable length encoder then encodes the scanned data.

3 Claims, 1 Drawing Sheet

METHOD FOR COMPRESSING DYNAMIC IMAGE INFORMATION AND SYSTEM AND DEVICE THEREFOR

BACKGROUND OF THE INVENTION

1. Field of the Invention

The present invention relates to a method for compressing dynamic image information which is capable of processing compression of quantity of dynamic image data at high speed with high compression rate, and a system therefor.

2. Description of the Prior Art

In recent years, many such algorithmic methods for stationary and dynamic image compression as disclosed in U.S. Pat. No. 5,164,819 have been standardized because of their high efficiencies which utilize discrete cosine transformation (hereinafter referred to simply as DCT) using only cosine function in orthogonal transformation encoding in a dynamic image frequency band and having excellent power concentration to low-frequency components. In these, an image is divided into small blocks of N pixels in each of horizontal and vertical directions (small blocks each composed of N×N pixels), each of the small blocks of the image is subjected to two-dimensional DCT and then encoded by allocating an appropriate number of bits thereto. After the establishment of JPEG (Joint Photographic Experts Group which was formed by ISO and CCITT jointly. The standard proposed by the JPEG is also called JPEG), an algorithmic method was proposed as a standard which is based on adaptive discrete cosine transformation (ADCT mode) capable of providing most preferred encoded image quality.

The proposed method is systematized such that an image of 8×8-pixel blocks is subjected to two-dimensional DCT in terms of each block of 8×8 pixels as a unit to obtain DCT coefficients, each of the coefficients is linearly quantized by using quantized matrices with different quantized step sizes assigned to the respective coefficients, and that with respect to direct current components, each difference between a direct current component and that of the neighboring block on the left is quantized, and that with respect to alternating current components, they are first zigzag-scanned and rearranged in one-dimensional array, and each coefficient is examined whether it is zero or not, and consecutive zero coefficients has its length counted as a run length, and on detection of a non-zero coefficient, result of quantization thereof is subjected to two-dimensional Huffman coding in combination with a run length of the preceding zero coefficients (as for Huffman coding, see D. A. Huffman, "A Method for the Construction of Minimum Redundancy Codes", Proc. IRE, 40, 10, pp. 1098–1101 (September 1952)).

SUMMARY OF THE INVENTION

However, in spite of the fact that DCT is capable of providing both high-speed operation and real-time image transformation, most of conventional methods have utilized algorithms other than DCT with respect to compression in the time direction. This is probably because throughput of a digital device was poor at the time of introduction of DCT algorithm, and accordingly, there was no room for consideration of extension of application of DCT to the time direction which requires more operations.

The present invention has been made in view of the above-mentioned problem inherent in the conventional technique. The algorithm according to the present invention aims at providing methods and systems for motion picture compression utilizing DCT-based compression algorithms to apply DCT process block in time direction, thus improving compression rate and reducing computation load. It is an object of the present invention to provide a method and a system for compressing dynamic image information which are capable of attaining improved compression rate and reducing operation amount by constructing a DCT-based compression algorithm that applies DCT-treated blocks to the time direction.

According to the present invention, a method for compressing dynamic image information is provided to thereby solve the above problem. The method may comprise:
dividing each frame of dynamic image data of 16 frames into 4×4 pixel blocks in such a manner that the blocks do not overlap with each other;
subjecting each of the blocks to a first zigzag scan step;
arranging the scanned blocks in the order of the frames to form a 16×16 block;
subjecting the 16×16 block to two-dimensional DCT,
multiplying the 16×16 data by quantization coefficients to perform quantization;
subjecting the quantized DCT data to a second zigzag scan step from low- to high-frequency components to store the data as a one-dimensional array; and
reducing a necessary number of bits of the scanned data by means of undefined-length (variable-length) codes.

According to further aspect of the present invention, a system or device for compressing dynamic image information is provided to thereby solve the above problem. The system or device may comprise:
divider for dividing each frame of dynamic image data of 16 frames into 4×4 pixel blocks in such a manner that the blocks do not overlap with each other;
first zigzag scanner for arranging each of the blocks in the order of the frames to form a 16×16 block;
two-dimensional orthogonal transformation for subjecting the block to two-dimensional DCT to encode units of the block in a frequency band;
quantizing circuit for multiplying the 16×16 data by quantization coefficients to approximate values of the data at discrete levels;
second scanner for storing the quantized DCT data as a one-dimensional array from low- to high-frequency components; and
undefined-length (variable-length) encoder for reducing a necessary number of bits of the scanned data by means of undefined-length (variable-length) codes.

In the method and system or device according to the present invention for compressing dynamic image information, 4×4-pixel blocks into which a frame is divided by a block divider 1 are arranged in the order of frames by means of a first zigzag scanner 2 to preliminarily form a 16×16 block, and the block is subjected to 16×16 two-dimensional DCT by means of two-dimensional orthogonal transformer 3. It is thereby possible to reduce operation amount to a unit computation time per pixel of 8 as compared with that of a unit computation time per pixel of 9 in a case where three-dimensional DCT is applied to a block of 8×8×8 pixels.

BRIEF DESCRIPTION OF THE DRAWINGS

FIG. 2 illustrates zigzag scan mode, in which

DETAILED DESCRIPTION OF THE PREFERRED EMBODIMENTS

Figure 1:
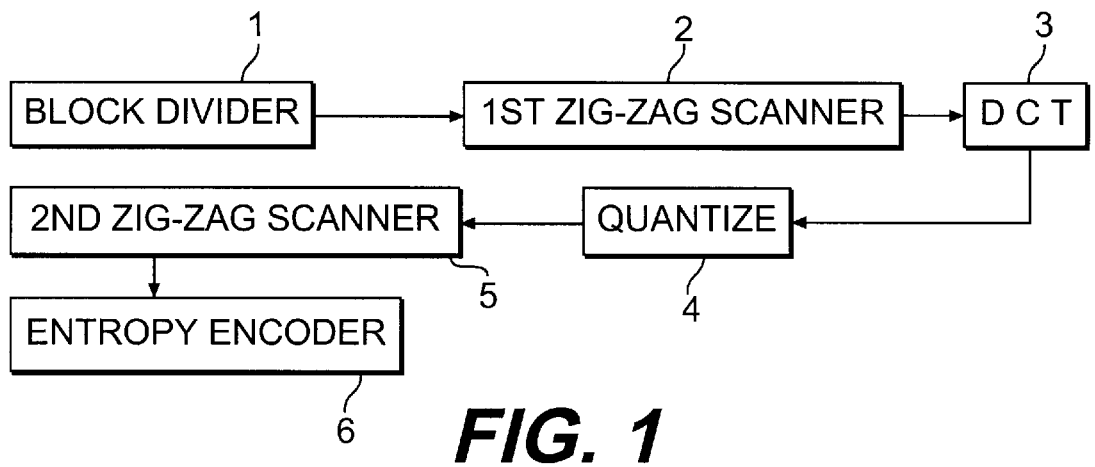
FIG. 1 is a block diagram of algorithm systematically showing an embodiment of the present invention.
Figure 2A:
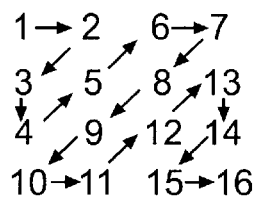
FIG. 2(A) shows a first zigzag scan step on each of blocks of 4×4 pixels and FIG. 2(B) shows a second zigzag scan step on quantized DCT data.
Figure 2B:
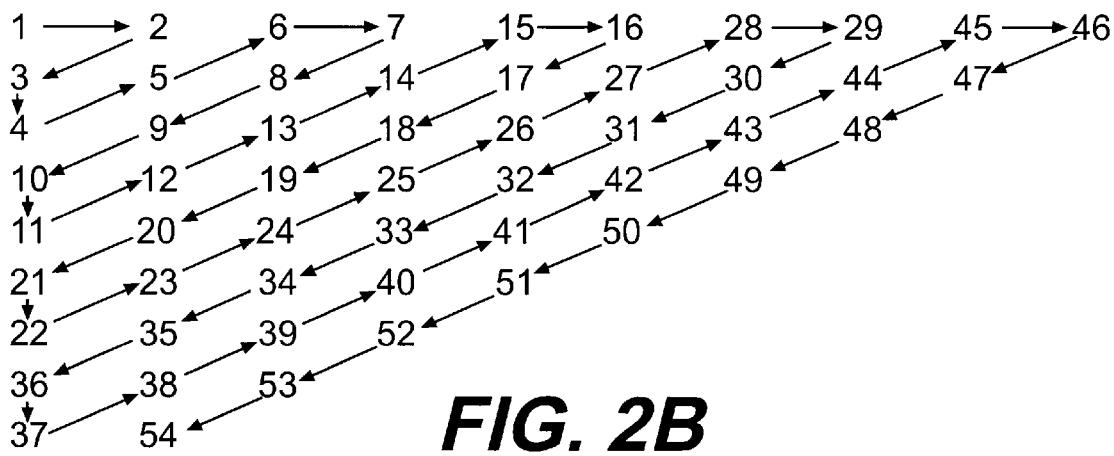

In the following, an embodiment of the present invention will be described with reference to the drawings. FIG. 1 is a block diagram of a DCT-based compression algorithm. FIGS. 2A and 2B illustrates zigzag scan mode, in which FIG. 2A shows a first zigzag scan step on each of blocks of 4×4 pixels and FIG. 2B shows a second zigzag scan step on quantized DCT data. In the algorithm as illustrated in FIGS. 1, 2A and 2B, each frame of dynamic image data of 16 frames is divided by the block divider 1 into 4×4-pixel blocks in such a manner that the blocks do not overlap with each other, each of the blocks is sent to first zigzag scanner 2 and scanned. The scanned blocks are arranged in the order of the frames to form a 16×16 block (see FIG. 2A).

Then, the 16×16 block is transmitted to two-dimensional orthogonal transformer 3 and subjected to two-dimensional DCT to encode each of block units in a frequency band. Then, the encoded data is transmitted to quantizer 4 and quantized by means of, for example, quantization matrices with different quantization step sizes allotted to respective DCT coefficients. The 16×16 data is multiplied by an externally assigned quantization coefficients (scaling factor) for rendering code quantity and decoded image quality controllable to approximate the data at a discrete level.

Then, the quantized DCT data is transmitted to second zigzag scanner 5 to store the data as a one-dimensional array from low- to high-frequency components (see FIG. 2B). Then, the scanned data is transmitted to undefined-length (variable-length) encoder 6 such as an entropy encoder to reduce a necessary number of bits of the scanned data by using an undefined-length (variable-length) code.

In the illustrated embodiment, the undefined-length (variable-length) encoder 6 is often referred to as entropy encoding, and is used, in particular, in a case where distribution of level occurrence frequency is not uniform. Short codes are allotted to levels occurring with high frequencies and long codes are allotted to those occurring with low frequencies to thereby reduce an average code length on the whole. So-called Huffman coding method is used as a blockwise code-assigning method to encode significance coefficients.

Besides this, a non-blockwise code-allotting method may be used. As the non-blockwise code-assigning method, there may be used, for example, a so-called arithmetic encoding mode in which binary fractional numbers showing positions of sections or segments on a probability number line divided according to occurrence probabilities of symbol series are defined as codes on the series and code words are composed or created sequentially by arithmetic operations, or other encoding modes.

When comparison in operation amount is made between a case where 8×8×8-pixel blocks are subjected to three-dimensional DCT in a manner analogous to that in a conventional mode of usual image compression using DCT (for example, JPEG) in which 8×8-pixel blocks are used and subjected to DCT and then zigzag-scanned and a case where 4×4-pixel blocks are preliminarily subjected to the first zigzag scan step and then a block of 16 frames is subjected to 16×16 two-dimensional DCT in accordance with the algorithm of the embodiment of the present invention, the results are as follows:

In general, operation amount in one-dimensional DCT on n points is proportional to n×n, and that in high speed DCT is proportional to $n\log_2 n$. That in n-dimensional DCT is equal to the sum of those in one-dimensional DCTs sequentially applied to each direction of dimensions. Thus, (operation amount in 8×8×8 three-dimensional DCT)=8× (8×8—$\log_2 8$+8×8×$\log_2 8$)+64×8×$\log_2 8$=64×3×8×$\log_2 8$= 4608, i.e., 4608/(8×8×8)=9 (unit computation time) per pixel. On the other hand, (operation amount in 4×4×16 DCT according to the embodiment of the present invention)=16× 16×$\log_2 16$+ 16×16×$\log_2 16$)=32×16×$\log_2 16$=2048, i.e., 2048/(16×16)=8 (unit computation time) per pixel.

The present invention is constructed as described above. In particular, it is capable of reducing operation amount and compressing dynamic image information to a minimum by constructing a DCT-based compression algorithm which applies DCT-treated blocks to the time direction.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for compressing dynamic image information, said method comprising:

dividing each frame of dynamic image data of 16 frames into 4×4 pixel blocks in such a manner that the bloc ks do not overlap with each other;

subjecting each of the pixels in each of the 4×4 pixel blocks to a first zigzag scan step;

arranging 16 corresponding scanned 4×4 pixel blocks, one from each of the 16 frames, in the order of the frames to form a 16×16 block;

subjecting the 16×16 block to two-dimensional DCT;

multiplying the 16×16 data by quantization coefficients to perform quantization;

subjecting the quantized DCT data to a second zigzag scan step from low frequency to high-frequency components to store the data as a one-dimensional array; and reducing a necessary number of bits of the scanned data by undefined-length (variable-length) codes.

2. A system for compressing dynamic image information, said system comprising:

dividing means for dividing each frame of dynamic image data of 16 frames into 4×4 pixel blocks in such a manner that the blocks do not overlap with each other;

first zigzag scanner means for arranging each of the zigzag scanned pixels of 16 corresponding 4×4 pixel blocks, one from each of the 16 frames, in the order of the frames to form a 16×16 block;

two-dimensional orthogonal transformation means for subjecting the 16×16 block to two-dimensional DCT to encode units of the block in a frequency band;

quantizing means for multiplying the encoded 16×16 data by quantization coefficients to approximate values of the data at discrete levels;

second scanner means for storing the quantized DCT data as a one-dimensional array from low frequency to high-frequency components; and undefined-length (variable-length) encoding means for reducing a necessary number of bits of the scanned data by undefined-length (variable-length) codes.

3. A compressing dynamic image information device comprising:

a divider which divides each frame of dynamic image data of 16 frames into 4×4 pixel blocks in such a manner that the blocks do not overlap with each other;

a first zigzag scanner which arranges each of the pixels of 16 corresponding zigzag scanned 4×4 pixel blocks, one from each of the 16 frames, in the order of the frames to form a 16×16 block;

a two-dimensional orthogonal transformer which subjects the 16×16 block to two-dimensional DCT to encode units of the block in a frequency band;

a quantizer which multiplies the encoded 16×16 data by quantization coefficients to approximate values of the data at discrete levels;

a second scanner which stores the quantized DCT data as a one-dimensional array from low- to high-frequency components; and an undefined-length (variable-length) encoder which reduces a necessary number of bits of the scanned data by undefined-length (variable-length) codes.

* * * * *